US008973254B2

(12) United States Patent  
Droste

(10) Patent No.: US 8,973,254 B2  
(45) Date of Patent: Mar. 10, 2015

(54) SYSTEM AND METHOD FOR RAPID BATTERY EXCHANGE IN ELECTRIC VEHICLES

(71) Applicant: Peter C. Droste, Garrison, NY (US)

(72) Inventor: Peter C. Droste, Garrison, NY (US)

(73) Assignee: Jasper EV Tech, LLC, Aspen, CO (US)

( * ) Notice: Subject to any disclaimer, the term of this patent is extended or adjusted under 35 U.S.C. 154(b) by 0 days.

(21) Appl. No.: 13/788,360

(22) Filed: Mar. 7, 2013

(65) Prior Publication Data

US 2014/0250653 A1 Sep. 11, 2014

(51) Int. Cl.
*B23P 19/00* (2006.01)
*B60L 11/18* (2006.01)

(52) U.S. Cl.
CPC .................................. *B60L 11/1877* (2013.01)
USPC ............................................................. 29/730

(58) Field of Classification Search
CPC ............... B60K 2001/0455; B60K 2001/0472; B60K 2001/0494; B60K 6/405; B60S 5/06
USPC ........................................... 29/888, 729, 730
See application file for complete search history.

(56) References Cited

U.S. PATENT DOCUMENTS

| 4,299,526 | A | 11/1981 | Smith |
| 5,549,443 | A | 8/1996 | Hammerslag |
| 5,612,606 | A | 3/1997 | Guimarin |
| 5,711,648 | A | 1/1998 | Hammerslag |
| 5,998,963 | A | 12/1999 | Aarseth |
| 7,201,384 | B2 | 4/2007 | Chaney |
| 8,006,793 | B2 | 8/2011 | Heichal |
| 8,013,571 | B2 | 9/2011 | Agassi |
| 2007/0152630 | A1* | 7/2007 | Winkler et al. ............... 320/110 |
| 2009/0198372 | A1 | 8/2009 | Hammerslag |
| 2011/0177371 | A1 | 7/2011 | Belton |

(Continued)

FOREIGN PATENT DOCUMENTS

| EP | 735978 | 9/2000 |
| EP | 2298690 | 3/2011 |

(Continued)

OTHER PUBLICATIONS

Beissman, Tim, Renault Fleunce Z.E. launch delayed due to infrastructure hold-ups, Car Advice, Dec. 13, 2012, http://www.caradvice.com.au/205154/renault-fluence-z-e-launch-delayed-due-infrastructure-hold-ups/ (last visited Mar. 12, 2013).

Schwartz, Ariel, Can Better Place's Switchable Battery Technology Succeed in Australia, Fast Coexist, http://www.fastcoexist.com/1678165/can-better-places-switchable-battery-technology-succeed-in-australia (last visited Mar. 12, 2013).

(Continued)

*Primary Examiner* — Moshe Wilensky
(74) *Attorney, Agent, or Firm* — Ward & Zinna, LLC

(57) ABSTRACT

A system and method for the rapid exchange of batteries in an electric vehicle. The electric vehicle contains a removable battery housed in the vehicle's undercarriage. The electric vehicle moves through the exchange system either by propelling itself or by being propelled by the system. As the vehicle is propelled forward, the removable battery within the vehicle is unlocked from the vehicle and replaced with a charged battery. The charged battery forces the removable battery out of the rear of the vehicle as the vehicle moves forward through the exchange. The vehicle remains powered throughout the exchange process. Once the charged battery is aligned in position under the vehicle and connected to the vehicle through corresponding contacts, the charged battery is located into place in the vehicle's undercarriage and the vehicle is ready for additional driving.

13 Claims, 10 Drawing Sheets

STEP 500:

STEP 502:

(56) References Cited

U.S. PATENT DOCUMENTS

| | | | |
|---|---|---|---|
| 2011/0303509 A1 | 12/2011 | Agassi et al. | |
| 2012/0217077 A1* | 8/2012 | Ojima et al. | 180/68.5 |
| 2012/0233850 A1* | 9/2012 | Hozumi et al. | 29/729 |
| 2012/0271723 A1* | 10/2012 | Penilla et al. | 705/16 |
| 2012/0306445 A1* | 12/2012 | Park et al. | 320/109 |

FOREIGN PATENT DOCUMENTS

| | | |
|---|---|---|
| EP | 2231447 | 11/2011 |
| EP | 2397383 | 12/2011 |
| EP | 2420418 | 2/2012 |
| FR | 2801539 | 11/1999 |
| WO | WO 98/21132 | 5/1998 |
| WO | 2012036194 | 3/2012 |

OTHER PUBLICATIONS

Profita, Cassandra, Switchable Batteries for Electric Cars? Maybe . . . , Ecotrope, Jan. 17, 2013, http://www.opb.org/news/blog/ecotrope/switchable-batteries-for-electric-cars-maybe/ (last visited Mar. 12, 2013).

Todras-Whitehill, Tara, Don't Charge That Electric Battery; Just Change It, NPR, Aug. 21, 2012, http://www.npr.org/2012/08/21/159355676/dont-charge-that-electric-car-battery-just-change-it (lasted visited Mar. 12, 2013).

PCT's Notification of Transmittal of the International Search Report and the Written Opinion of the International Searching Authority, mailed Sep. 10, 2014.

* cited by examiner

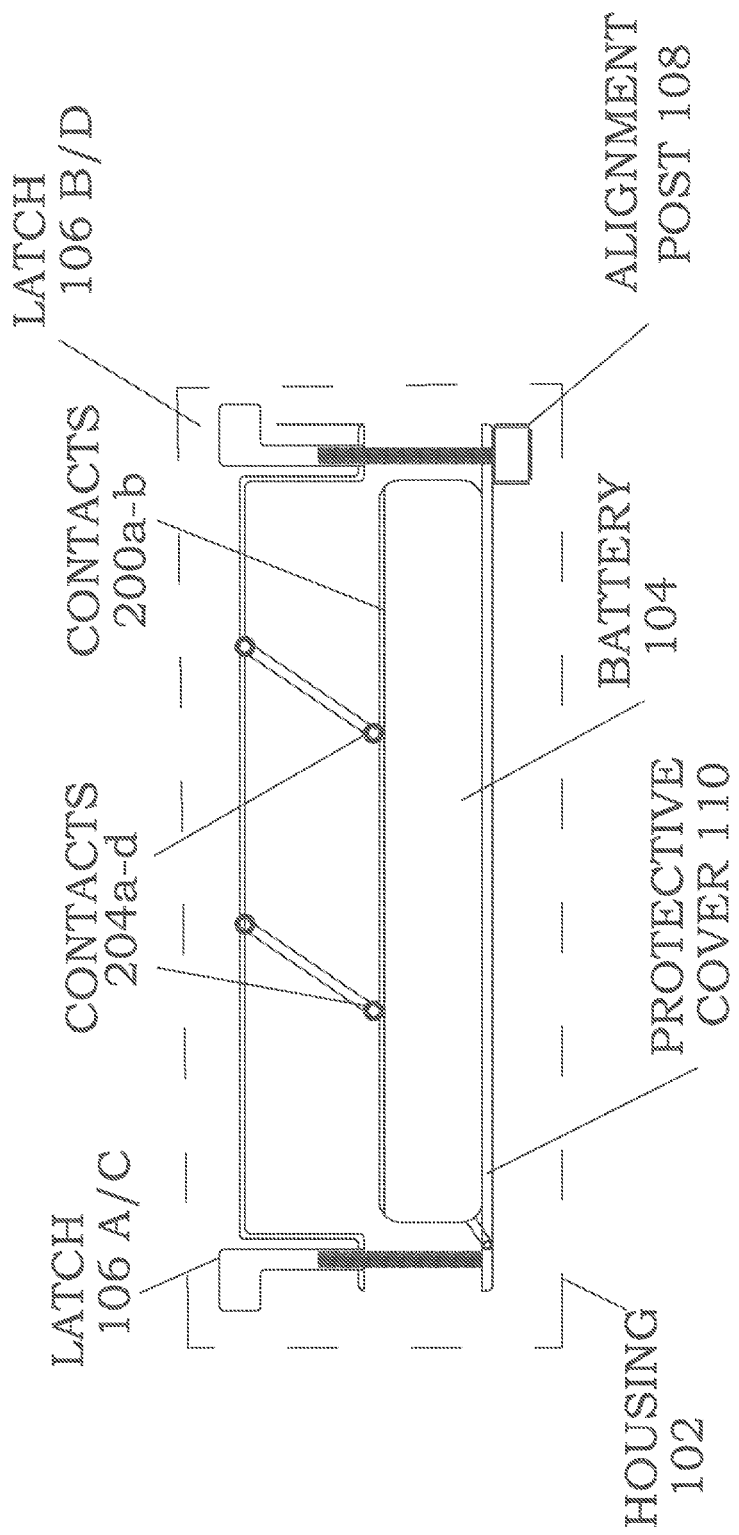

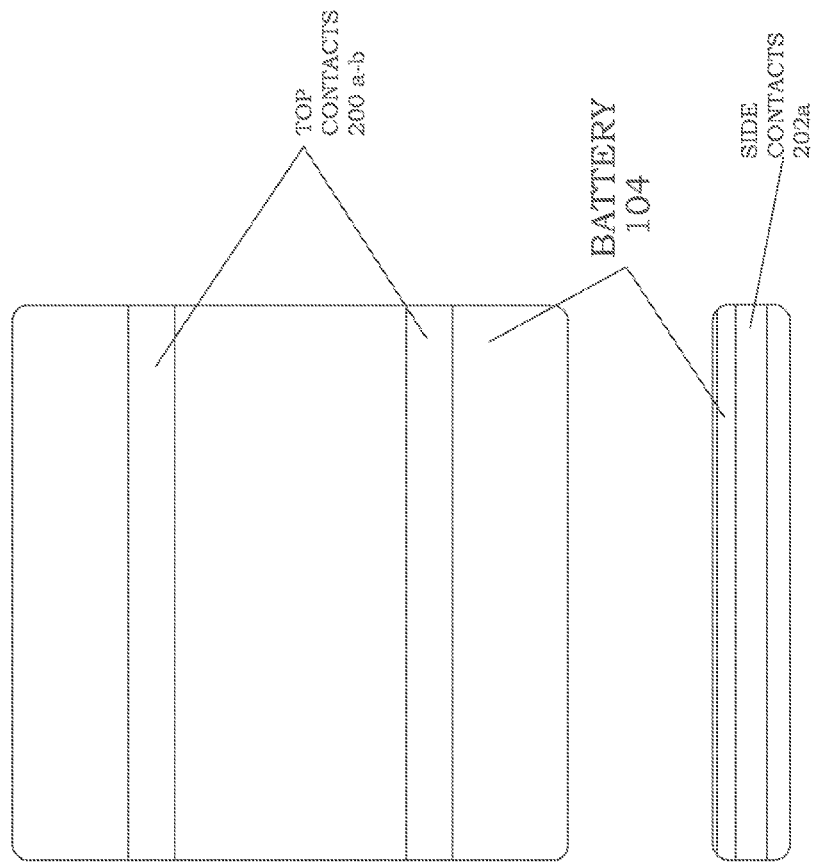

OVERHEAD VIEW

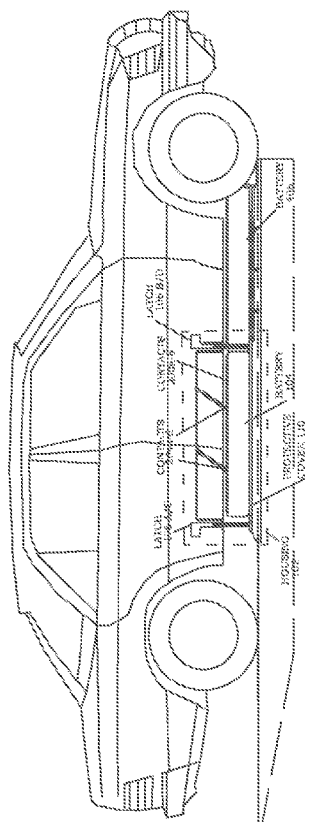
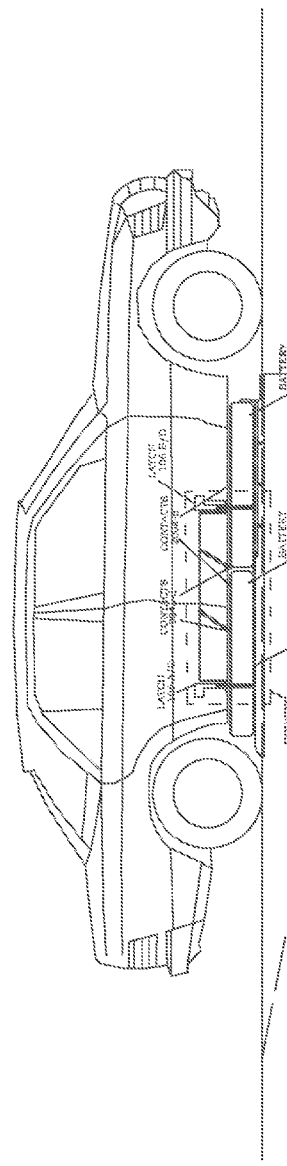

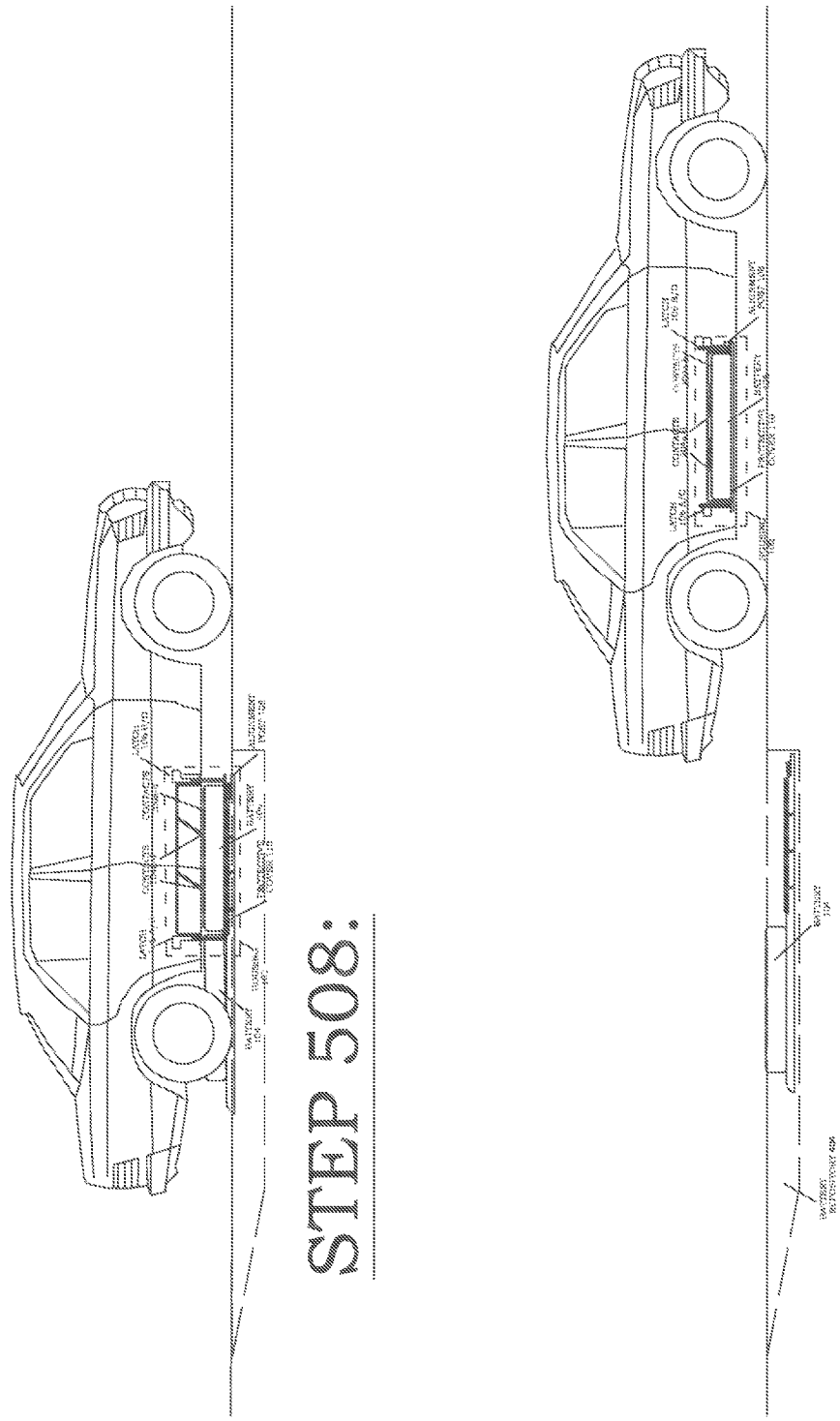

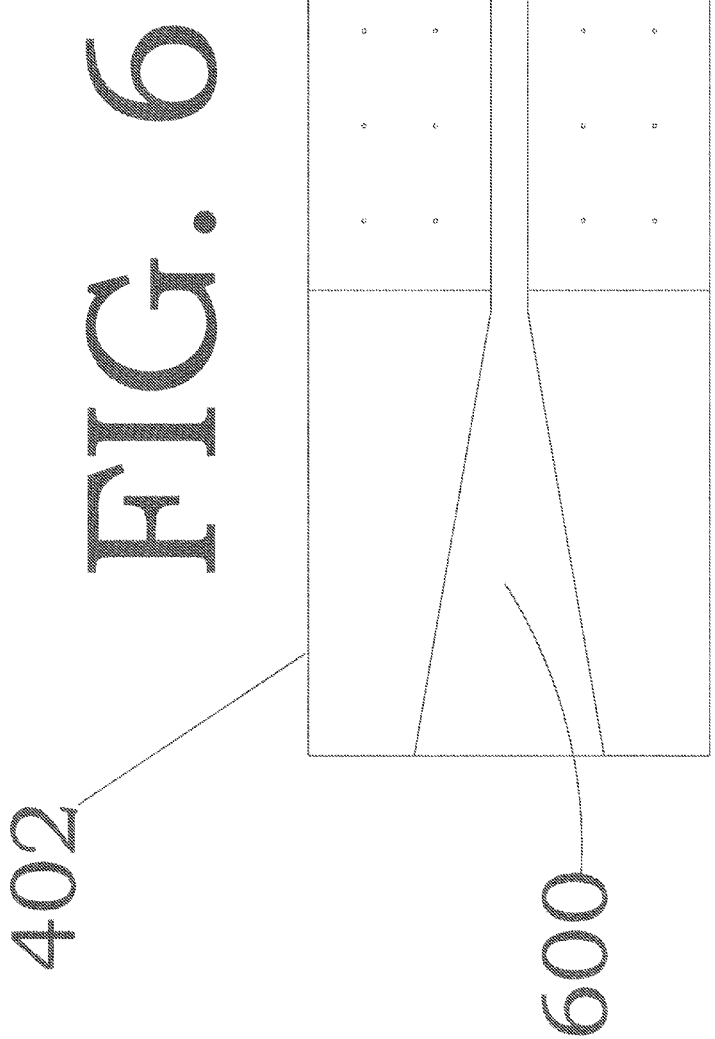

SYSTEM AND METHOD FOR RAPID BATTERY EXCHANGE IN ELECTRIC VEHICLES

FIELD OF THE INVENTION

The present invention relates generally to a system and method for the exchange of batteries in electric vehicles such as automobiles.

BACKGROUND OF THE INVENTION

Electric vehicles (including cars, trucks, sports utility vehicles, and other automobiles) have experienced an increased demand in recent years. This increase is due in part to the ever rising price of gasoline as well as the negative impact gasoline-based vehicles have on the environment. However, there are several current drawbacks to electric vehicles that make them less desirable to certain individuals relative to their gasoline-based counterparts. These drawbacks largely stem from limitations on electric vehicle batteries, including limited-mileage range and battery recharge requirements. Electric vehicles suffer from a relatively short mileage range due to, for example, restrictions with battery size and weight. Electric vehicles further suffer from the requirement of battery recharging, which interrupts travel during the recharge. During a standard battery recharge (which can take anywhere from an hour to several hours), the electric vehicle cannot be used.

Because of the long charge time for a standard battery recharge, direct current (DC) fast or rapid battery charging systems have been developed. While faster than standard charging, rapid charging still takes on average ten to thirty minutes or more for a complete charge. Further, it is well understood that rapidly charging a battery can significantly shorten the battery life. Since batteries are very costly, rapid charging is not suitable for everyday use.

Shared or public battery charging stations also exist (typically in urban areas) where an electric vehicle can be charged when not in use. These shared stations can utilize standard or rapid charge mechanisms. However, these shared stations suffer from the same drawbacks as with the battery charging described above. There are also concerns on the impact to the electric grid in urban areas, particularly when multiple vehicles are charging simultaneously.

As a result of the foregoing limitations on electric vehicles and corresponding electric vehicle battery recharging, several battery exchange systems have been developed. These known systems typically operate using a specially-designed service station that exchanges a depleted battery for a charged one. However, as described in more detail below, each of these systems suffer from several deficiencies. For example, the known systems require a complex, expensive service station that utilizes an external power source and/or external motive power to power and complete the battery exchange; the vehicle to be completely stopped and/or shut off during the battery exchange; long exchange times; and/or the depleted battery to be completely removed prior to installing a charged replacement battery; among other deficiencies.

One such system known in the art discloses dedicated battery-switching stations that power the exchange of a depleted battery with a freshly charged battery. The system requires vehicles with batteries located underneath the vehicle. The vehicle drives up a ramp and is aligned with a battery shuttle mechanism within a switching area of the station. Once the vehicle is stopped and turned off in the switching area, a battery shuttle engages from underneath the vehicle and rises up toward the bottom of the vehicle. The shuttle makes contact with the depleted battery in the vehicle. Once it makes contact, the shuttle releases the battery, removes it and moves it away from the vehicle. After the depleted battery is completed removed and away from the vehicle, the system installs a new charged battery into the vehicle. The depleted battery is then recharged for further use.

Another system known in the art discloses a battery transfer and charging system for electric vehicles with a displacement station that removes used batteries by forcing charged batteries into position within the vehicle so as to laterally displace the used batteries. The electric vehicle drives into the displacement station and stops at a specified location for the battery removal and installation in either a horizontal or vertical manner. While the vehicle is stopped and in the displacement station, the displacement station powers the removal of the used battery and replacement with a charged battery utilizing a hydraulic ram to forcefully displace the used battery.

Still another system known in the art discloses a service center whereby an electric vehicle is driven into the service center that powers a battery exchange. Once the vehicle is stopped in the service center and shut off, the system unlocks the depleted battery from the vehicle and removes it vertically downward from the vehicle utilizing lifting means located in a pit of the service center beneath the vehicle. After the depleted battery is completely removed from the vehicle, similar to other known systems, the system installs a charged battery into the vehicle utilizing lifting means that lift the battery into place. The battery is then locked into position and the vehicle is ready for further driving.

In view of the foregoing and the limitations on known electric vehicle battery exchange systems, there is a need for an improved battery exchange system for the exchange of batteries in electric vehicles whereby an electric vehicle is moved through the exchange system to rapidly replace a depleted battery located in a battery bay in the vehicle's undercarriage with a charged replacement battery. During the exchange, the vehicle slowly moves forward through the exchange system. The vehicle may propel itself or may be propelled by the system. The depleted battery need not be completely removed prior to installation of the charged replacement battery. Further, the vehicle may remain powered during part or all of the exchange process as the charged replacement battery replaces the depleted battery in contact with the vehicle.

SUMMARY OF THE INVENTION

The present invention is a system and method for the efficient exchange of batteries in electric vehicles. A battery is located in place in a housing (such as a battery bay) in the undercarriage of the vehicle. The housing is positioned such that it does not interfere with the vehicle's drive train. The housing may be built into a new vehicle or retrofitted onto an existing vehicle on the underside of the existing vehicle. The battery is typically a standardized unit suitable for use in multiple types of vehicles. However, depending on the specific vehicle requirements and designs, multiple sizes and types of batteries (e.g., lithium-ion, lead-acid, nickel metal hydride, absorbed glass mat, gel cell, etc.) and multiple configurations of those batteries are possible.

During the battery exchange, a depleted battery located in the undercarriage of the electric vehicle is exchanged with a charged battery. The exchange system itself may be located at a variety of locations, including a service station or home. In one embodiment, due in part to the simplicity of the exchange system, it may also be portable, which would advantageously allow a service vehicle (e.g., tow truck) to exchange a depleted battery of a vehicle that was unable to make it to an exchange service station, home, or other location of an exchange system (e.g., akin to a gasoline-powered vehicle running out of gas before making it to a gas service station).

As the vehicle propels itself forward through the exchange system, the depleted battery is unlocked from the vehicle and a charged battery slides into the vehicle's housing. The system may also propel the vehicle through the exchange utilizing tracks or other alignment mechanisms that may engage the vehicle's wheels and move the vehicle along a conveyor belt or the like on the tracks. The charged battery forces or pushes out the depleted battery from the rear of the car into a battery repository. The batteries include contacts (such as contact rails) located on one or more of its sides (e.g., top, sides, bottom, rear, front). The vehicle includes contacts (which may be, e.g., located within the housing or be part of the housing) that enable the vehicle to receive the new charge of current from the charged battery as soon as the charged battery slides into the vehicle's housing and makes physical connection with contacts of the vehicle thereby enabling the vehicle to be constantly powered during the exchange. The vehicle may be powered for part or all of the exchange by the depleted battery and/or the replacement battery as long as the vehicle has not been disabled (e.g., turned off). In the event that the vehicle has been disabled, it is possible that the vehicle may temporarily not be powered, that power may be provided through an external source, or that the exchange system may power the vehicle through the exchange. The vehicle may also include one or more capacitors or the like that provide temporary power to the vehicle during a brief period of the exchange, e.g., until one or more contacts of the charged battery make physical connection with one or more contacts of the vehicle such that the charged battery is able to provide power to the vehicle. In such an instance, the vehicle continues to be powered throughout the exchange and is able to propel itself as long as it has not been disabled.

After the depleted battery has been removed, it is tested and/or recharged within a recharging system independent of the vehicle. The recharging system may be portable such that it can be located at the exchange or at some other remote location such as a home. The recharging system may be automatic or manual and may simultaneously charge multiple batteries. Once tested and/or recharged, the removed battery is returned to the exchange system for future use. The return to the exchange system may be automatic or manual. The battery exchange itself may be completed in substantially less time than it takes to fully recharge a battery.

BRIEF DESCRIPTION OF THE DRAWINGS

These and other objects and advantages of the present invention will be apparent to those of ordinary skill in the art in view of the following detailed description in which:

FIG. 2B depicts a battery within a housing of an undercarriage of an electric vehicle in an unlocked position of an illustrative embodiment of the invention;

FIG. 3A depicts a detailed view of the battery's contacts of an illustrative embodiment of the invention;

FIGS. 5A-C depict an overview of the rapid battery exchange process of an illustrative embodiment of the invention; and FIG. 6 depicts a guidance post entry channel of an exchange and/or alignment plate of an illustrative embodiment of the invention.

DETAILED DESCRIPTION OF THE INVENTION

Figure 1:
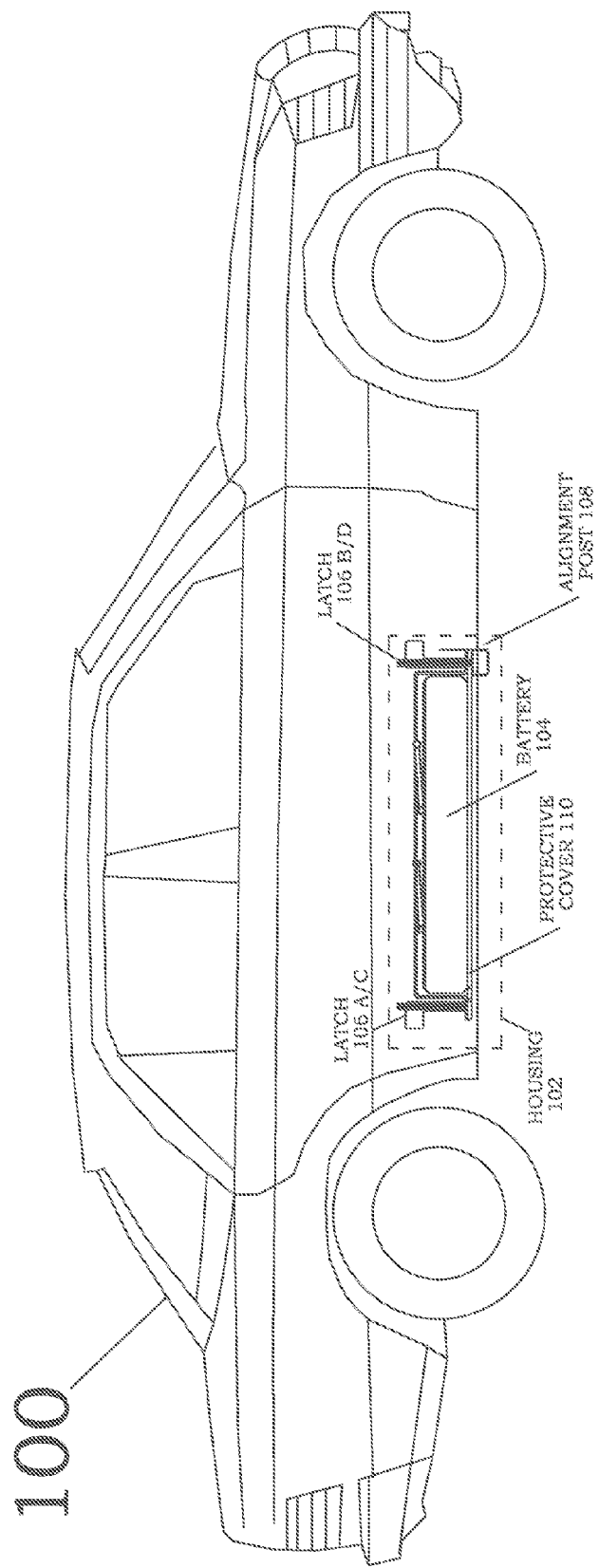
FIG. 1 depicts an overview of an electric vehicle with exchangeable battery of an illustrative embodiment of the invention.

FIG. 1 depicts an overview of an electric vehicle 100 with exchangeable battery 104 of an illustrative embodiment of the invention. Exchangeable battery 104 may be a depleted battery, which is generally a battery that has less than a full or complete charge. Vehicle 100 includes a housing 102 (such as a battery bay) located in the undercarriage of vehicle 100. Housing 102 fits battery 104 and connects within vehicle 100. Housing 104 is positioned within vehicle 100 so as not to interfere with the drive train of vehicle 100. Housing 104 may be built into a new vehicle 100 or retrofitted onto an existing vehicle on the underside of the existing vehicle.

As shown in FIG. 1, battery 104 is locked into place utilizing latches 106a-d. Although shown as latches 106a-d, a variety of latching or locking mechanisms are possible that latch or lock battery 104 within housing 102, such as compression, draw, barrel, square, hasps, gate, spring, toggle, swell, scissor jack, bolts, locks, hydraulic lift within the vehicle that raises and/or lowers the housing, etc. The latching or locking mechanism may be one continuous structure or separate structures within or connected to housing 102. The latching or locking mechanism may be mechanical or electrical (e.g., automated via onboard sensors, software, digital circuitry or the like).

An alignment post 108 may further be utilized to align vehicle 100 with the battery exchange and/or alignment plate (shown in FIG. 4) as vehicle 100 approaches the exchange. A protective cover 110 may also be provided to protect battery 104 from nature (e.g., rain, rocks, debris, etc.) when it is locked in housing 102. Protective cover 110 may be slid or swung open, dropped or extended down, retracted or otherwise moved as battery 104 is in unlocked position such that protective cover 110 does not interfere with the exchange of battery 104 with a charged replacement battery. Protective cover 110 may be opened mechanically (e.g., via a mechanical trigger) or electrically (e.g., via onboard sensors, software, digital circuitry or the like). Protective cover 110 may be separate from and connected to housing 102 or it may be part of or integrated within housing 102.

Although vehicle 100 is depicted as a car, one of ordinary skill in the art will appreciate that multiple different types of vehicles can be utilized in accordance with the present invention, such as trucks, sport utility vehicles or other automobiles capable of housing a battery bay in the vehicle's undercarriage. Similarly, although only one battery is shown in vehicle 100 of FIG. 1, one of skill in the art will appreciate that multiple batteries may be used in differing configurations. For example, depending on the configuration and battery requirements of the vehicle, two or more batteries may be placed side-by-side or front-to-back. Additionally, the present invention allows for batteries of varying size and type (e.g., lithium-ion, lead-acid, nickel metal hydride, absorbed glass mat, gel cell, etc.) to be utilized depending on the vehicular requirements. The exchange system described below is designed to account for such variation.

Figure 2A:
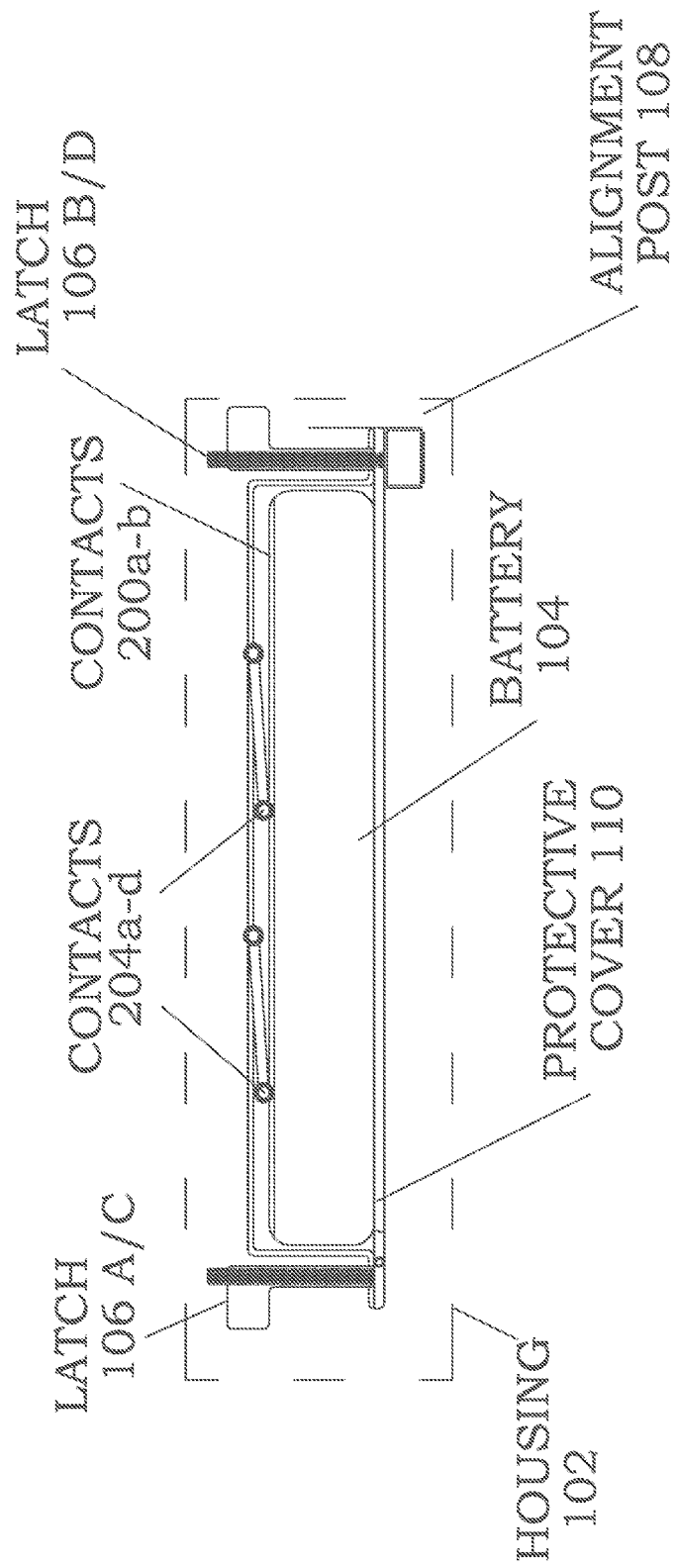
FIG. 2A depicts a battery within a housing of an undercarriage of an electric vehicle in a locked position of an illustrative embodiment of the invention.

FIG. 2A depicts battery 104 within housing 102 of the undercarriage of electric vehicle 100 in a locked position of an illustrative embodiment of the invention. Battery 104 may be locked in place using latches 106a-d or other locking mechanisms as described above with respect to FIG. 1. Battery 104 includes top contact rails 200a-b and/or side contact rails 202a-b (side contact rail 202a is shown in FIG. 3A). In one embodiment, top contact rail 200a is positive and top contact rail 200b is negative. Top contact rails 200a-b are connected to corresponding contacts 204a-d of housing 102. For example, contacts 204a-b may be aligned along top contact rail 200a and contacts 204c-d may be aligned along top contact rail 200b. Contact rails 200a-b may remain in physical connection with corresponding contacts 204a-d of vehicle 100 during the battery exchange. A variety of configurations and designs of contact rails are possible. Contact rails 200a-b and 202a-b may be strips, channels, grooves or the like on the top/sides of battery 104 that receive and/or securely fit contacts 204a-d within or on top of the respective contact rails. Front or rear contact rails may also be used. The contact rails may extend along all or only part of the top and/or side of the battery. As described below, each of contacts 204a-d includes or is connected to a rod, pole, arm, cable or the like that slides along respective contact rails 200a-b during the battery exchange. The rod, pole, arm, cable or other structure may be rigid or flexible. In this manner, contacts 204a-d remain in contact with respective contact rails 200a-b as battery 104 is removed from housing 102 out the rear of vehicle 100 during at least an initial part of the exchange.

FIG. 2B depicts battery 104 within housing 102 of the undercarriage of electric vehicle 100 in an unlocked position of an illustrative embodiment of the invention. Battery 104 may be unlocked in a variety of manners, including using mechanical or electrical latches or locks, or various sensor identification systems that trigger an unlocking mechanism in or connected to housing 102 as vehicle 100 reaches a certain position within the exchange system (e.g., digital circuitry, radio frequency identification (RFID), optical identification, radar, infrared, etc.). When in unlocked position as shown in FIG. 2B, battery 104 has been slid or swung out, or dropped down from the undercarriage of vehicle 100 such that it is in physical contact with the exchange and/or alignment plate (described below in FIGS. 4, 5A-C) and can readily be removed and replaced by a charged battery. In the event that protective cover 110 has also been dropped down, battery 104 may not physically touch the exchange and/or alignment plate, but instead battery 104 rests on protective cover 110, which in turn physically touches the exchange and/or alignment plate. Battery 104 may continue to power vehicle 100 as contacts 204a-d extend down during the unlocking process of housing 102 thereby enabling contacts 204a-d to remain connected to contact rails 200a-b during at least an initial part of the exchange.

FIG. 3A depicts an alternative view of top contact rails 200a-b and side contact rail 202a of battery 104. Contact rail 202b is not shown, but is located on the opposite side of contact rail 202a. Battery 104 provides charge to vehicle 100 through contacts 204a-d of vehicle 100. Battery 104 may also provide charge to vehicle 100 through corresponding vehicle contacts connecting to side contacts 202a-b. One of skill in the art will appreciate that multiple contact configurations are possible within the scope of the present invention. For example, both top and side contacts may be used, only top contacts, or only side contacts. In one embodiment, there is one contact rail for each pole (negative and positive) on either the sides or the top of battery 104. When the side contacts are used, there may be two contact rails on single side or one contact rail on each side. Corresponding contacts 204a-d of vehicle 100 are also included. One of skill in the art will also appreciate that differing numbers of vehicle contacts may also be used. An onboard sensor may be included that detects when a battery (such as battery 104) is connected to vehicle 100. A charged replacement battery (discussed below) contains similar or the same contacts to those illustrated in FIG. 3A.

Figure 3B:
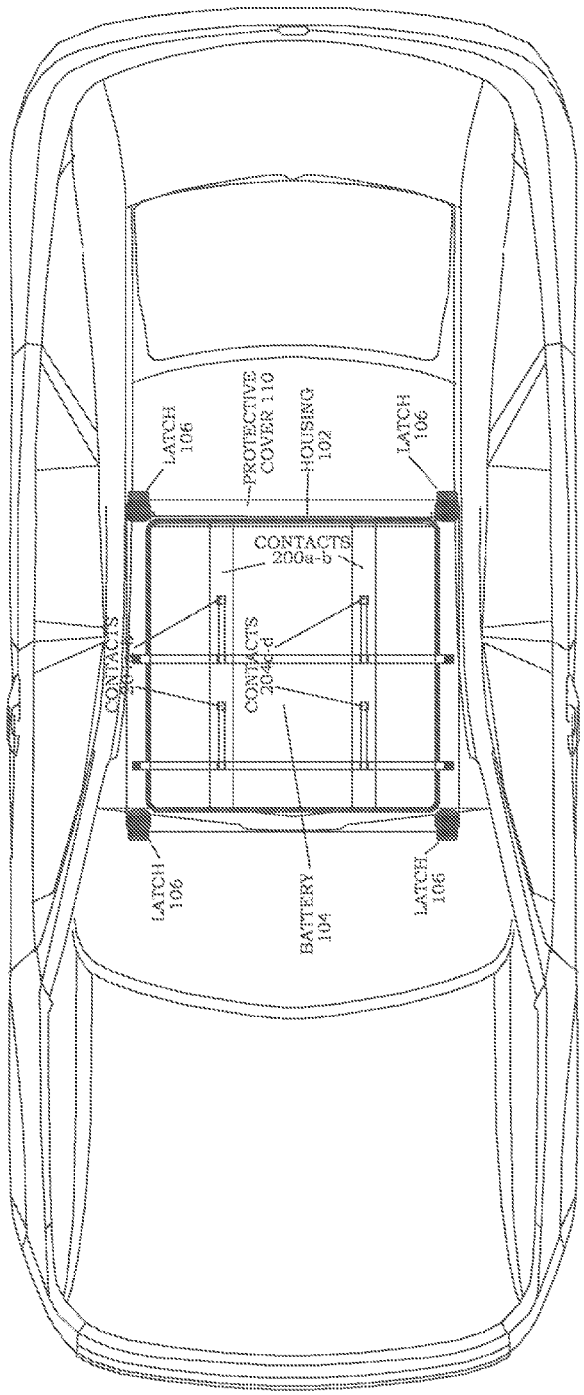
FIG. 3B depicts an overhead view of the battery connected to the vehicle of an illustrative embodiment of the invention.

FIG. 3B depicts an overhead view of contact rails 200a-b of battery 104 connected to contacts 204a-d of vehicle 100. Contacts 204a-d may be entirely within housing 102, partially within housing 102 or part of housing 102. Contacts 204a-d include or are connected to a rod, pole, arm, cable or the like such that they can slide along contact rails 200a-b during the battery exchange. The rods, poles, arms, cables or the like can be thought of as an extension to the contacts such that power from battery 104 can be provided through the rods, etc. and into necessary parts of vehicle 100. Contact 204a-b are shown along positive contact rail 200a and contacts 204c-d are shown along negative contact rail 200b. Contacts 204a and 204c are parallel to each other closer to the rear of vehicle 100. Contacts 204b and 204d are parallel to each other closer to the front of vehicle 100.

Figure 4:
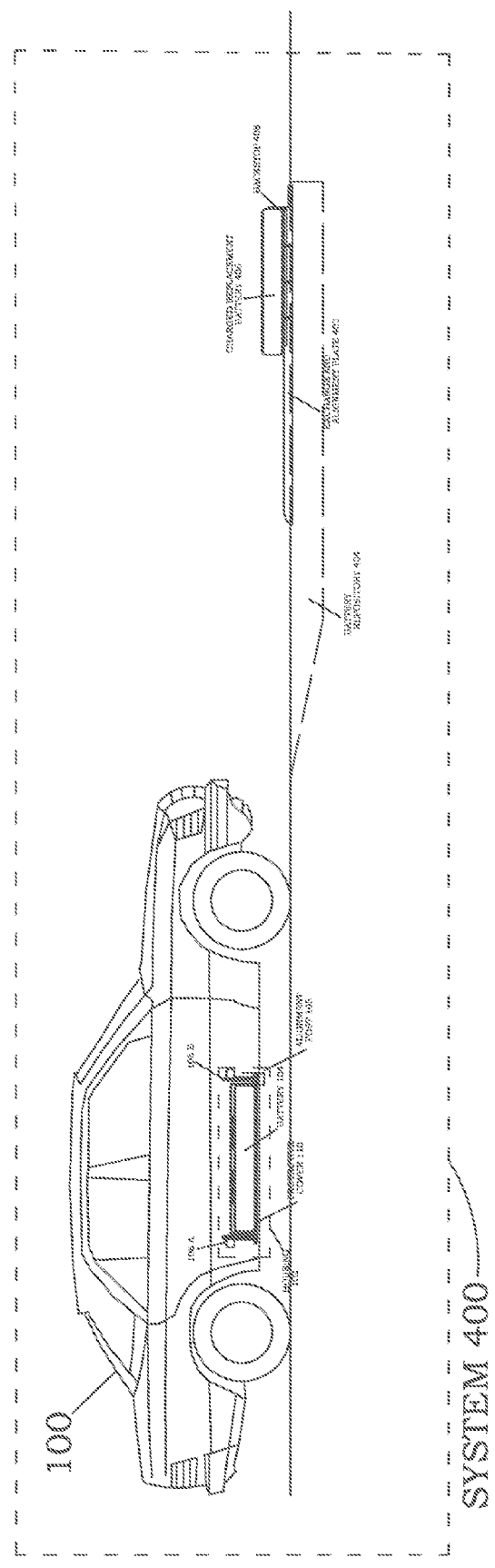
FIG. 4 depicts an overview of the battery exchange system of an illustrative embodiment of the invention.

FIG. 4 depicts an overview of battery exchange system 400 of an illustrative embodiment of the invention. Exchange system 400 includes an exchange and/or alignment plate 402 which aligns vehicle 100 as it approaches the exchange (shown in FIG. 6). Exchange system 400 and exchange and/or alignment plate 402 may be designed to account for varying sizes and battery configurations. Although shown as a single structure, exchange and/or alignment plate 402 may be more than one structure. Exchange system 400 further includes a battery repository 404 (such as a battery pit or depository) which houses the depleted battery as it is being removed from vehicle 100. Battery repository 404 may also be part of exchange and/or alignment plate 402. Exchange system 400 may also include tracks or the like that accept vehicle 100 as it moves into exchange system 400. The tracks may also align vehicle 100 with exchange and/or alignment plate 402. The tracks may also include a conveyor belt or other mechanism that propels vehicle 100 through the exchange. The tracks may be designed to allow for multiple sizes and types of vehicles, e.g., multiple tracks of varying width, tracks that expand/contract to align with the wheels of vehicle 100, etc. Vehicle 100 may approach the tracks and once aligned within the tracks, a wheel lock or engagement ensures that vehicle 100 remains aligned through the exchange. Vehicle 100 may be placed in neutral gear or alternatively shut off once it is on or engaged with the tracks. Also shown in FIG. 4 is a charged replacement battery 406 that is fixed into place by battery mount 408 (such as a backstop or other barrier). Mount 408 serves to keep charged replacement battery 406 in place as vehicle 100 is propelled or moves through exchange system 400. For example, mount 408 may be a plate, barrier, wall, sheet, blockade or the like that is connected to exchange and/or alignment plate 402. Mount 408 may be permanently fixed to or removable from exchange and/or alignment plate 402. In one embodiment, mount 408 is perpendicular to exchange and/or alignment plate 402. In this manner, charged replacement battery 406 pushes or forces depleted battery 104 out of the rear of the exchange and into battery repository 404. Mount 408 may move laterally along exchange and/or alignment plate 402 such that charged replacement battery 406 aligns with approaching vehicle 100. Mount 408 may drop down into exchange and/or alignment plate 402 once vehicle 100 reaches a certain point (e.g., once charged replacement battery 406 is aligned within housing 102). There may be a mechanical or electrical trigger that causes mount 408 to drop down. Mount 408 may also be designed such that it is lower than the body of vehicle 100 such that it does not interfere as vehicle 100 moves forward on the exchange.

Alignment post 108 of vehicle 100 may further aid in alignment as vehicle 100 approaches. Charged replacement battery 406 is compatible with vehicle 100 and fits within housing 102. Charged replacement battery 406 is typically of the same type and specifications as battery 104, although it does not need to be the exact same type so long as it is compatible with vehicle 100.

Figure 5A:
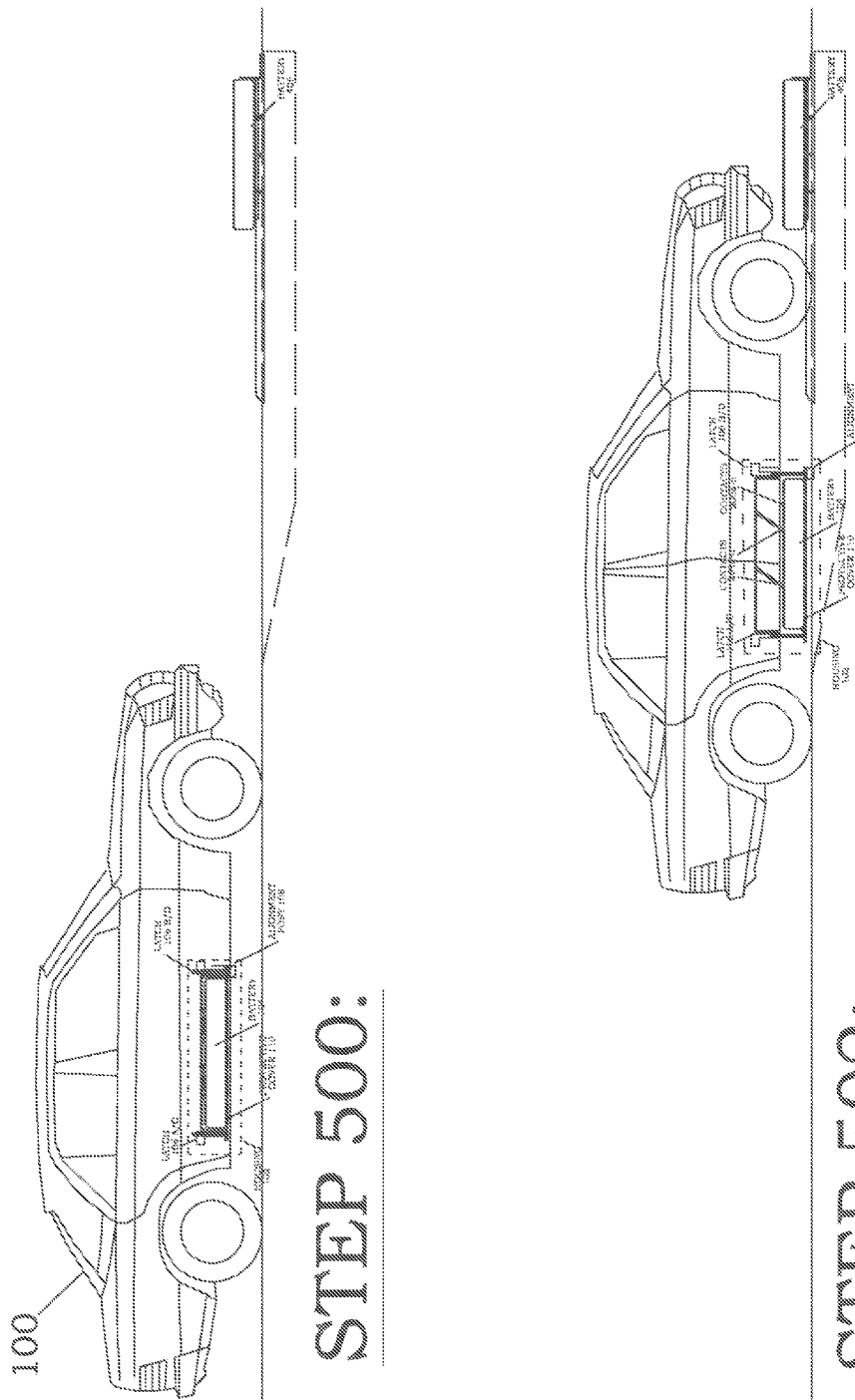

FIGS. 5A-C depict an overview of the rapid battery exchange process of an illustrative embodiment of the invention. At 500 of FIG. 5A, vehicle 100 is driven into battery exchange system 400, typically at a slow crawl (e.g., a few miles an hour). As discussed above, vehicle 100 may propel itself through the exchange, or the system itself may propel vehicle 100 through the exchange. If the exchange is moving vehicle 100 forward, vehicle 100 may be in neutral or turned off. If the system includes tracks, vehicle 100 may be aligned with the tracks. At 502, vehicle 100 reaches the exchange and/or alignment plate 402 and latches 106*a-d* (or other latching or locking mechanism) are unlocked. As described above, the latching or locking mechanism can be mechanical, electrical, or a combination of the two. As latches 106*a-d* are unlocked, depleted battery 104 (which remains in contact with contacts 204*a-d* of vehicle 100 through contact rails 200*a-b* and/or 202*a-b*) swings, slides, or drops down from housing 102 and onto exchange and/or alignment plate 402. The contacts of vehicle 100 (such as contacts 204*a-d*) likewise extend such that they remain physically connected to contact rails 200*a-b* and/or 202*a-b* of battery 104 during the initial portion of the exchange. Contacts 204*a-d* include or are connected to rods or the like that swing down or extend so that they stay connected with battery 104 as housing 102 containing battery 104 is unlocked and rests on top of exchange and/or alignment plate 402. During the unlocking stage, protective cover 110 may also be slid or swung out, dropped or extended down, refracted or otherwise moved such that it does not impede with the battery exchange.

The unlocking of housing 102 containing battery 104 may occur as vehicle 100 drives over an unlatching or unlocking post that when in contact with one or more of latches 106*a-d* serves to unlatch housing 102 from within electric vehicle 100. The unlatch post may serve as a key to unlock housing 102 containing depleted battery 104. To avoid any accidental unlocking during normal driving (e.g., over a bump or pothole), the unlatch post may be fitted to receive the latches (e.g., it may contain specially fitted grooves or the like that map to latches 106*a-d* or other latching or locking structure). The unlocking of battery 104 may also occur electronically using onboard digital circuitry of vehicle 100 or other sensor systems that sense when battery 104 is within exchange and/or alignment plate 402. For example, exchange system 400 may incorporate various sensors (e.g., radar, RFID, infrared, optical such as barcodes, and the like). In one embodiment, an RFID transponder senses when vehicle 100 containing an RFID tag is within proximity of exchange system 400. Each of the unlocking mechanisms may be used alone or in conjunction with each other. For example, RFID may be used in conjunction with an unlatch post. In this manner, battery 104 is only unlocked if the RFID of vehicle 100 is sensed by exchange system 400 and vehicle 100 propels over the unlatch post.

At 504 of FIG. 5B, as vehicle 100 continues to progress forward within exchange system 400, depleted battery 104 on exchange and/or alignment plate 402 comes into contact with charged replacement battery 406. Contacts 204*a-d* remain connected to contact rails 200*a-b* of depleted battery 104 and depleted battery 104 continues to provide power to vehicle 100. Vehicle 100 may be continually powered during the exchange as long as it has not been disabled (e.g., turned off). In the event that the vehicle has been disabled, it is possible that power may be provided through an external source and/or that the exchange system powers the vehicle through the exchange.

In one embodiment, each of the batteries has side contacts such that when the side contacts of the respective batteries physically contact each other in parallel, charged replacement battery 406 can provide charge to vehicle 100 through depleted battery 104, which in turn is connected to contacts 204*a-d* of vehicle 100 through top contact rails 200*a-b*. In another embodiment with top contact rails 200*a-b*, charged replacement battery 406 begins to provide charge to vehicle 100 as soon as the contact rails of charged replacement battery 406 make physical connection with one or more of corresponding contacts 204*a-d* of vehicle 100. In this manner, the vehicle is always powered during the exchange process as long as it has not been disabled.

There may also be a temporary window during which vehicle 100 is not powered by the batteries but instead is powered by one or more capacitors or the like of vehicle 100 that provide temporary power until vehicle 100 senses charged replacement battery 406 and can provide power to vehicle 100. Once charged replacement battery 406 has been sensed, the capacitor ceases to provide charge. The capacitor may then be recharged during normal vehicle operation for future use. In one embodiment, vehicle 100 may include a small secondary battery that provides temporary power during a portion of the exchange. The secondary battery may then be recharged within vehicle 100 during normal operation such that it can be used during future exchanges. Vehicle 100 may also incorporate onboard sensors in the form of digital circuitry or similar that sense when contacts of charged replacement battery 406 are connected to corresponding contacts of vehicle 100. Vehicle 100 may also include onboard sensors that can determine whether charged replacement battery 406 includes side and/or top contacts, and adjust accordingly.

At 506, as depleted battery 104 on top of exchange and/or alignment plate 402 is being forced or pushed out the rear of vehicle 100 by charged replacement battery 406 on or next to mount 408 that keeps charged replacement battery 406 in place (e.g., prevents it from shifting, sliding and/or moving, etc. along the exchange), the contact rails of charged replacement battery 406 (such as contact rails 200*a-b* and/or 202*a-b*) come into physical connection with front contacts of vehicle 100 (such as contacts 204*b* and 204*d*, which include or are connected to rods, poles, arms, cables, or the like that enable the contacts to slide along the respective contact rails). Rear contacts 204*a* and 204*c* remain connected to contact rails 200*a-b* of depleted battery 104. At this point, vehicle 100 may be powered by one or more of depleted battery 104, charged replacement battery 406 or the capacitors or secondary batteries described above. For example, vehicle 100 may temporarily be powered by one or more capacitors or the like as vehicle 100 shifts from depleted battery 104 to charged replacement battery 406 during the exchange.

At 508 of FIG. 5C, vehicle 100 has progressed forward by further propelling itself or by the exchange moving it forward such that charged replacement battery 406 is aligned underneath housing 102 and depleted battery 104 has been forced or pushed further toward the rear of vehicle 100 and exchange and/or alignment plate 402. Depleted battery 104 drops into battery repository 404. At 510, housing 102 is shown as being locked into place. In one embodiment, a latching or locking post (not shown; which may be the same as the unlocking or unlatching post described above) pushes latches 106a-d or other latching or locking mechanism back into vehicle 100 so that vehicle 100 now has housing 102 containing charged replacement battery 406 locked into the undercarriage and is ready for further driving. The exchange system may also incorporate onboard sensors of vehicle 100 (e.g., RFID, radar, optical, infrared, etc.) that determine when charged replacement battery 406 is within housing 102. When in position, vehicle 100 may power the return of housing 102 into locked position (as shown in FIG. 2A). Vehicle 100 may also include a hydraulic lift or other mechanism to lock charged replacement battery 406 into place within vehicle 100. During the exchange, protective cover 110 is also returned to its locked position.

Depleted battery 104 is then recharged using a recharging system for use in a future exchange. The recharging system may be part of the exchange system or it may be separate from the exchange system. The recharging system may be portable in a similar manner as the exchange system itself. The recharging system may be automated or manual and may simultaneously charge multiple batteries. Repository 404 may house the recharging system. Depleted battery 104 may also be passed through repository 404 into a separate recharging system connected to repository 404. Once tested and/or recharged, depleted battery 104 is returned to the exchange system for future use (and once charged, effectively becomes charged replacement battery 406). The return to the exchange system may be automated such that charged batteries are automatically placed in line for future use within the exchange. For example, if the system has multiple charged batteries, the system may utilize a conveyor-belt, ramp, shuttle or the like that automatically places charged replacement battery 406 on or next to mount 408 within exchange system 400. A user may also place a charged battery on or next to mount 408. Such a scenario is particularly useful in a portable situation described above.

FIG. 6 depicts an overhead view of guidance post entry channel 600 of exchange and/or alignment plate 402 of an illustrative embodiment of the invention. If exchange and/or alignment plate 402 is off center relative to approaching vehicle 100, guidance post entry channel 600 moves exchange and/or alignment plate 402 to align it with approaching vehicle 100. In this manner, the system allows for driver-error in the vehicle approach. The tracks described above may allow for similar driver-error.

Although the invention has been described in terms of certain illustrative embodiments, other embodiments that are apparent to one of ordinary skill in the art in view of the disclosure are also within the scope of the invention. Accordingly, the scope of the invention is intended to be limited only by reference to the claims.

What is claimed is:

1. A battery exchange system comprising:
   an electric vehicle comprising:
      a first battery within a battery house located on an underside of the vehicle comprising a first and second contact rail extending a length of the first battery, the first and second contact rails of the first battery fitted to engage first and second front contact rods and first and second rear contact rods extending from the vehicle, the contact rods each comprising first and second rollers at distal ends, the first rollers each connected to the first battery and the second rollers each connected to the battery house for the contact rods to reach from the underside of the vehicle to a top side of the first battery as the first battery is lowered from the battery house;
   a self-contained propelling mechanism within said vehicle for moving the vehicle forward as the first battery is exchanged with a second battery; and
   an exchange plate comprising:
      the second battery comprising a first and second contact rail extending a length of the second battery, the first and second contact rails of the second battery fitted to engage the first and second front and rear contact rods, the second battery located on the exchange plate and the second battery to be exchanged with the first battery;
      a mount on the exchange plate keeping the second battery in place over the exchange plate as the vehicle moves forward and the first battery touches the second battery to provide continual charge to the electric vehicle through a connection between the first and second contact rails of the second battery and the first and second front contact rods and the first and second contact rails of the first battery and the first and second rear contact rods; and
      at least one post connected to the exchange plate, the post fitted to disengage one or more latches of the battery house as the vehicle moves over the post such that the first battery becomes located on the exchange plate and positioned horizontally next to the second battery and reengage the one or more latches of the battery house once the second battery is in place within the battery house.

2. A system according to claim 1, wherein the exchange plate further comprises an alignment plate that aligns the vehicle with the exchange plate.

3. A system according to claim 1, wherein the system further comprises a battery repository connected underneath the exchange plate capable of receiving the first battery removed from the electric vehicle.

4. A system according to claim 1, wherein the system further comprises a battery recharging station that charges the first battery independent of the electric vehicle.

5. A system according to claim 1, wherein the system further comprises a sensing identification system.

6. A system according to claim 5, wherein the sensing identification system is selected from the group consisting of a radio frequency identification system, a radar system, an infrared system, and an optical identification system.

7. A system according to claim 1, wherein one or more of the contact rails are adapted to receive at least one contact of the electric vehicle.

8. A system according to claim 1, wherein the system further comprises one or more tracks to align one or more wheels of the electric vehicle with the exchange plate.

9. A system according to claim 8, wherein the one or more tracks comprise a conveyor to move the electric vehicle through the system.

10. A system according to claim 1, wherein the exchange plate is adapted to receive the electric vehicle propelling itself as the first and second batteries are exchanged.

11. A vehicle battery exchange system comprising:
   a first battery contained in a battery house on the underside of said vehicle and held in place by a latch, said first battery having a contact rail for connecting with a contact rod in said battery house, said contact rod comprising first and second rollers at distal ends, said first roller connected to said first battery and said second roller connected to said battery house for said contact rod to reach from said underside of said vehicle to a top side of said first battery as said first battery is lowered from said battery house;

a second battery removably fixed to an exchange plate, said second battery having a contact rail for connecting with a contact rod in said battery house;

a self-contained propelling mechanism within said vehicle for moving said vehicle such that said first battery comes in contact with and is then ejected from said battery house by said second battery;

said exchange plate further comprising:
- a mount to hold said second battery in place on said exchange plate and to align said second battery with said first battery to facilitate said battery exchange, and
- a post to disengage said latch to allow battery exchange and to reengage said latch following battery exchange.

12. A system according to claim 11, wherein the exchange plate further comprises an alignment plate that aligns the vehicle with the exchange plate.

13. A system according to claim 11, wherein the system further comprises one or more tracks to align one or more wheels of the electric vehicle with the exchange plate.

* * * * *